(12) United States Patent
Lee et al.

(10) Patent No.: US 11,542,822 B1
(45) Date of Patent: Jan. 3, 2023

(54) TURBINE BLADE WITH BLADE TIP EJECTOR

(71) Applicant: DOOSAN HEAVY INDUSTRIES & CONSTRUCTION CO., LTD., Changwon-si (KR)

(72) Inventors: Jae Bin Lee, Changwon (KR); Gene Chong, Jupiter, FL (US); Kibaek Kim, Changwon (KR); Seokbeom Kim, Changwon (KR); Bryan Bernier, Jupiter, FL (US)

(73) Assignee: Doosan Heavy Industries & Construction Co., Ltd., Changwon-si (KR)

(*) Notice: Subject to any disclaimer, the term of this patent is extended or adjusted under 35 U.S.C. 154(b) by 0 days.

(21) Appl. No.: 17/378,878

(22) Filed: Jul. 19, 2021

(51) Int. Cl.
*F01D 5/18* (2006.01)
*B22D 25/02* (2006.01)

(52) U.S. Cl.
CPC ............... *F01D 5/18* (2013.01); *B22D 25/02* (2013.01); *F05D 2220/32* (2013.01); *F05D 2230/21* (2013.01); *F05D 2240/30* (2013.01); *F05D 2260/20* (2013.01)

(58) Field of Classification Search
None
See application file for complete search history.

(56) References Cited

U.S. PATENT DOCUMENTS

| | | | |
|---|---|---|---|
| 4,893,987 A * | 1/1990 | Lee | F01D 5/20 416/97 R |
| 5,503,529 A | 4/1996 | Anselmi | |
| 5,927,946 A | 7/1999 | Lee | |
| 8,157,504 B2 | 4/2012 | Amaral | |
| 8,628,299 B2 * | 1/2014 | Ammann | F01D 5/186 416/97 R |
| 10,107,108 B2 * | 10/2018 | Jones | F02C 7/18 |
| 10,563,519 B2 * | 2/2020 | Webster | F01D 9/041 |
| 2011/0176929 A1 * | 7/2011 | Ammann | F01D 5/186 416/97 R |
| 2016/0319673 A1 * | 11/2016 | Jones | F02C 3/04 |
| 2018/0283183 A1 * | 10/2018 | Gallier | F01D 9/04 |
| 2019/0257205 A1 * | 8/2019 | Webster | F01D 5/187 |

* cited by examiner

*Primary Examiner* — Courtney D Heinle
*Assistant Examiner* — Danielle M. Christensen
(74) *Attorney, Agent, or Firm* — Shook, Hardy & Bacon, L.L.P.

(57) ABSTRACT

A turbine blade for a gas turbine engine. The turbine blade includes an airfoil having a tip cavity. The tip cavity has a floor bounded by a wall. A pocket opening is formed in the wall proximate a trailing edge of the turbine blade. A passageway communicates cooling medium from an internal cooling circuit to a cooling hole formed in part through the floor and in part through the trailing edge.

18 Claims, 6 Drawing Sheets

TURBINE BLADE WITH BLADE TIP EJECTOR

TECHNICAL FIELD

The present invention generally relates to a turbine blade for a gas turbine engine.

BACKGROUND

Gas turbine engines, such as those used for power generation or propulsion, include at least a compressor section, a combustor section, and a turbine section. The turbine section includes a plurality of blades that extend away from, and are radially spaced around, an outer circumferential surface of one or more rotor discs. Hot, pressurized gas passes from the combustor section to the turbine section and drives the rotor discs by applying a force to the plurality of blades.

Thus, the turbine blades are subjected to mechanical and thermal stresses that cause inefficiencies and part degradation. It is an on-going goal to reduce the thermal stresses on the turbine blades to allow the turbine blades to better withstand the operating environment. One method for reducing the thermal stresses is to cool the turbine blades. One method for cooling the turbine blades is to move a cooling medium, such as air, through an internal cooling circuit in the airfoil. As the cooling medium moves through the internal circuit of the airfoil, it cools the exposed surfaces within the internal circuit through convection.

Some portions of the turbine blade are very thin and cannot be effectively cooled with an internal cooling circuit alone. For example, portions of a turbine blade proximate a trailing edge of an airfoil are too thin to form an internal cooling circuit and therefore for a cooling medium to effectively pass through. Other portions of the turbine blade are also difficult to cool because of the movement of the turbine blade and rotor disc and the resultant momentum of the cooling medium. For example, cooling medium expelled into a blade tip of the turbine blade proximal to the trailing edge tends to spill over sidewalls of the blade tip rather than remain on surfaces of the blade tip to cool both of the sidewalls of the blade tip. Accordingly, due to these deficiencies, it would be desirable to add cooling capacity to the turbine blades to further, or more effectively, reduce the thermal load on these, and other, difficult-to-cool portions of the turbine blade.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes a turbine blade having an airfoil with a unique tip cavity at a blade tip. The tip cavity is located at a radially distal end of the airfoil when the turbine blade is coupled to a rotor disc. Further, the tip cavity is defined by a wall substantially enclosing a floor. A pocket opening is formed in the wall of the tip cavity at the trailing edge. Additionally, a cooling hole is located in part through the floor of the tip cavity and in part through the trailing edge of the airfoil. The cooling hole is in communication with an internal cooling circuit of the airfoil via a passageway. Cooling medium is ejected from the internal cooling circuit via the passageway, out of the cooling hole, and through the pocket opening. Ejecting the cooling medium in this manner provides increased cooling to this extreme corner of the airfoil, a notoriously difficult portion of the airfoil to cool, through convection as the cooling medium moves from the cooling hole and out of the pocket opening. Further, ejecting the cooling medium at high velocity from the cooling hole draws (e.g., by creating a pressure differential) cooling medium present in the tip cavity towards and through the pocket opening. Drawing the cooling medium towards and through the pocket opening further cools the extreme corner of the airfoil as well as the wall of the tip cavity and reduces the amount of leakage of the cooling medium over the wall of the tip cavity. As such, this unique tip cavity more effectively reduces the thermal load on the difficult-to-cool portions and reduces or eliminates known hot spots at the blade tip.

BRIEF DESCRIPTION OF THE DRAWINGS

The embodiments disclosed herein relate to compressor component airfoil designs and are described in detail with reference to the attached drawing figures, which illustrate non-limiting examples of the disclosed subject matter, wherein.

DETAILED DESCRIPTION

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies.

In brief, and at a high level, this disclosure describes a turbine blade having an airfoil with a unique tip cavity at a blade tip. The tip cavity is located at a radially distal end of the airfoil when the turbine blade is coupled to a rotor disc. Further, the tip cavity is defined by a wall substantially enclosing a floor. A pocket opening is formed in the wall of the tip cavity at the trailing edge. Additionally, a cooling hole is located in part through the floor of the tip cavity and in part through the trailing edge of the airfoil. The cooling hole is in communication with an internal cooling circuit of the airfoil via a passageway. Cooling medium is ejected from the internal cooling circuit via the passageway, out of the cooling hole, and through the pocket opening. Ejecting the cooling medium in this manner provides increased cooling to this extreme corner of the airfoil, a notoriously difficult portion of the airfoil to cool, through convection as the cooling medium moves from the cooling hole and out of the pocket opening. Further, ejecting the cooling medium at high velocity from the cooling hole draws (e.g., by creating a pressure differential) cooling medium present in the tip cavity towards and through the pocket opening. Drawing the cooling medium towards and through the pocket opening further cools the extreme corner of the airfoil as well as the wall of the tip cavity and reduces the amount of leakage of the cooling medium over the wall of the tip cavity. As such, this unique tip cavity more effectively reduces the thermal load on the difficult-to-cool portions and reduces or eliminates known hot spots at the blade tip.

Figure 1:
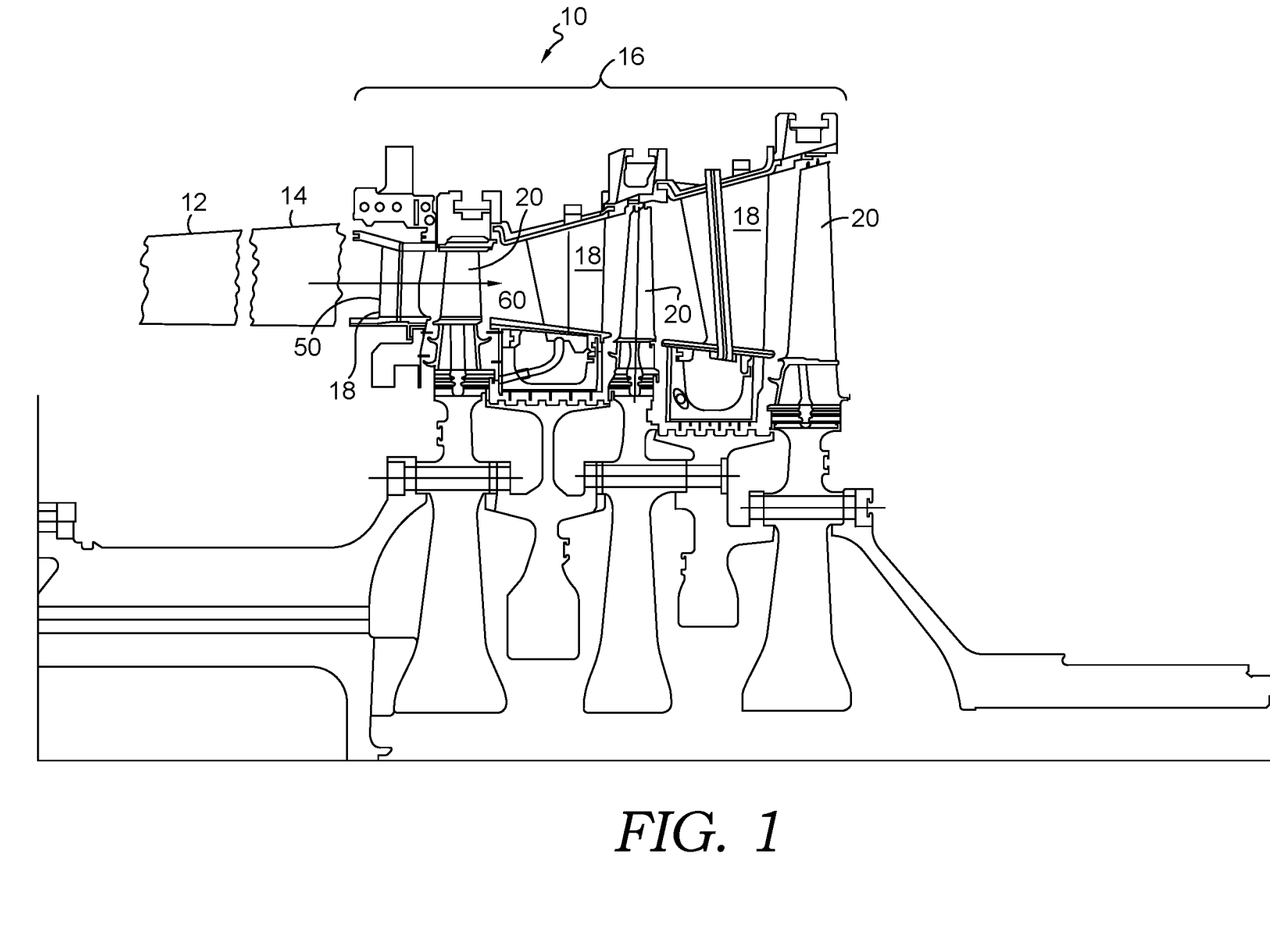
FIG. 1 depicts a schematic view of a gas turbine engine, in accordance with aspects hereof.

Turning now to FIG. 1, there is illustrated an aspect of a gas turbine engine 10. Certain components of the gas turbine engine 10 are shown schematically. For example, gas turbine engine 10 typically has at least a compressor section 12 (represented schematically), a combustor section 14 (represented schematically), and a turbine section 16. In the compressor section 12, the air is compressed and passed to the combustor section 14. In the combustor section 14, the pressurized air is mixed with fuel and ignited to generate hot, pressurized gas. This hot gas flows through a hot gas flow path (indicated by arrow 60) of the turbine section 16 and expands through the turbine section 16, where energy is extracted. The turbine section 16 may contain multiple turbine stages, each having a plurality of turbine nozzles 18 and a plurality of turbine blades 20. The turbine section 16 depicted in FIG. 1 includes three turbine stages, but other aspects may include greater or fewer number of stages. A first stage of the turbine section 16 directly follows the combustor section 14 and is exposed to the highest temperatures of the hot gas passing through the turbine section 16.

Figure 2:
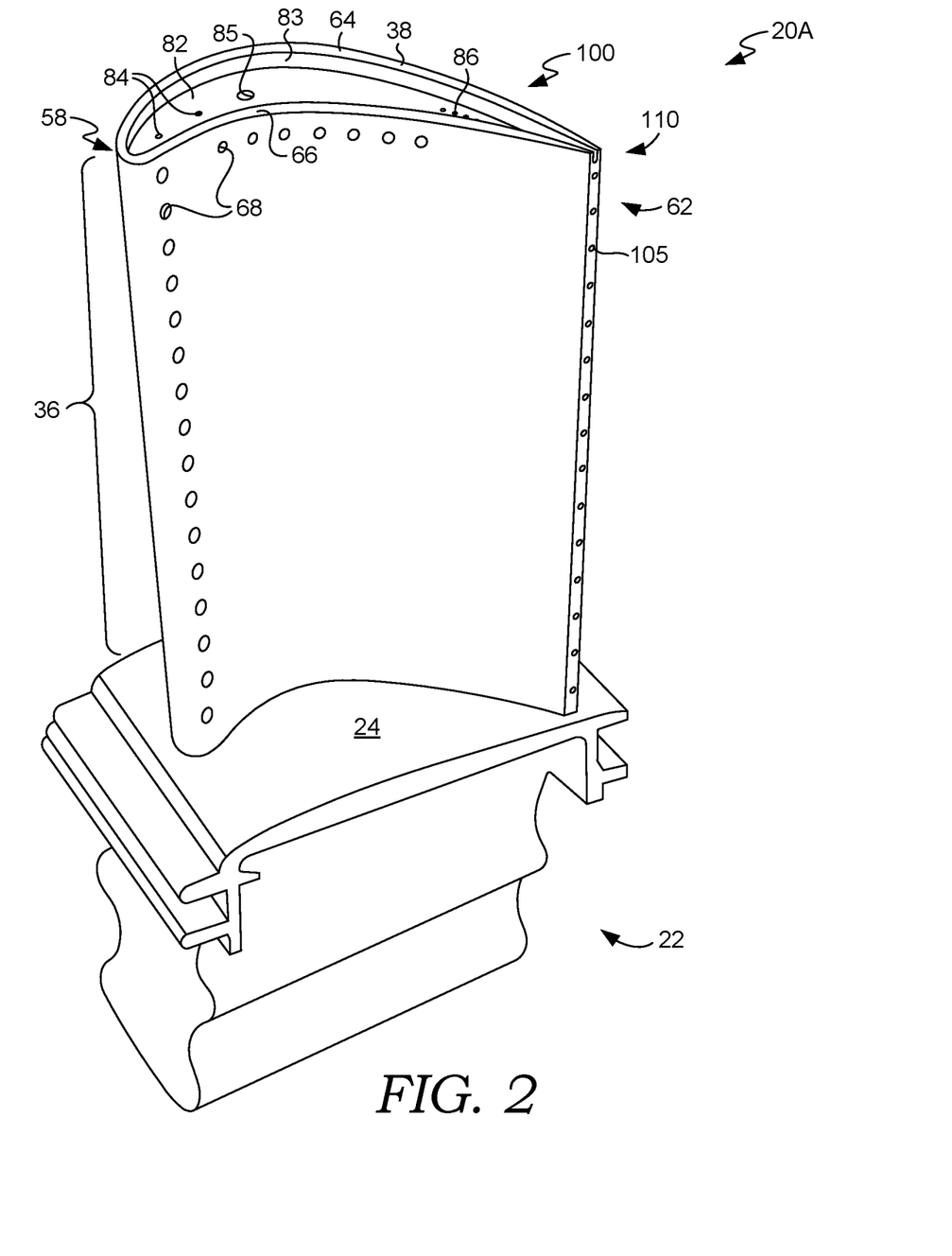
FIG. 2 depicts a perspective view of a turbine blade, in accordance with aspects hereof.

Referring to FIG. 2, a turbine blade 20A is depicted. The turbine blade 20A includes a root portion 22 configured to be coupled to a rotor disc. The root portion 22 extends from a radially proximal end (relative to the rotor disc when coupled thereto) to a platform 24. In aspects, the root portion 22 has a dovetail and a shank. For example, when the turbine blade 20A is coupled to the rotor disc the dovetail may be received within a slot in the rotor disc. In aspects, the shank may extend distally from the top of the dovetail to the platform 24. Extending distally away from the platform 24 is an airfoil 36.

The airfoil 36 includes a pressure sidewall 66 and a suction sidewall 64. Each of the pressure sidewall 66 and the suction sidewall 64 extend from a leading edge 58 to a trailing edge 62. The pressure sidewall 66 and the suction sidewall 64 are joined to one another at the leading edge 58 and the trailing edge 62. In some aspects, the pressure sidewall 66 and the suction sidewall 64 are integral to one another. The airfoil 36 generally extends from the platform 24 to a blade tip 38 located at a distal end (relative to the rotor disc when coupled thereto) of the turbine blade 20A.

Figure 3:
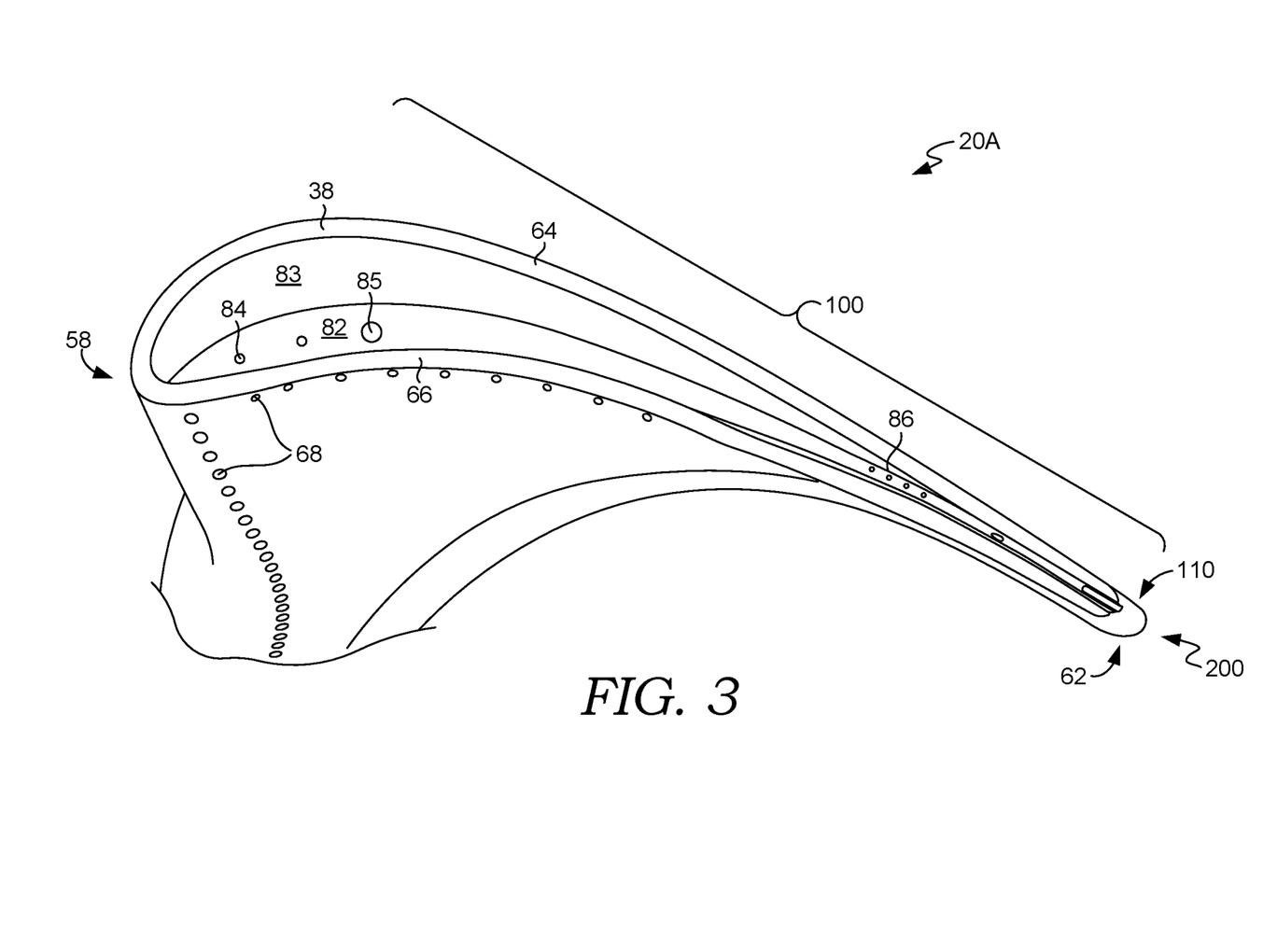
FIG. 3 depicts a perspective view of a portion of a turbine blade, in accordance with aspects hereof.
Figure 4:
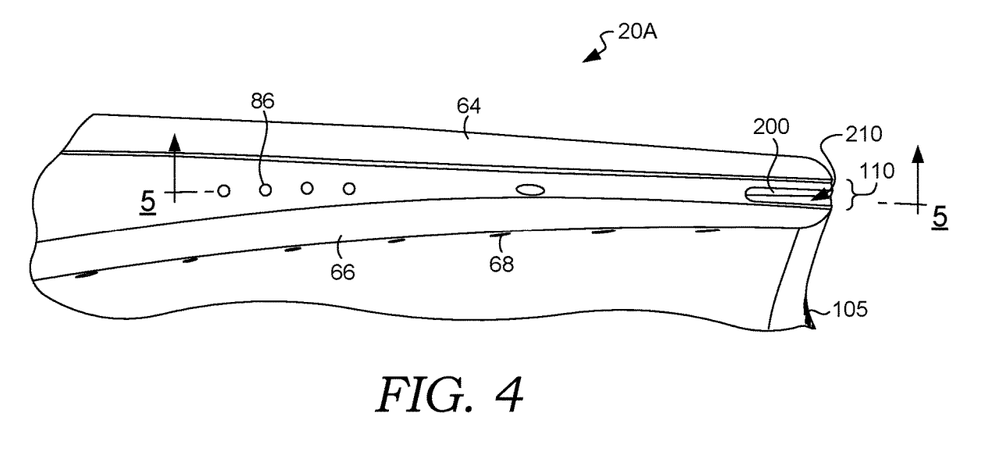
FIG. 4 depicts a portion of a blade tip proximal to a trailing edge, in accordance with aspects hereof.

Referring to FIGS. 3 and 4, the blade tip 38 includes a tip cavity 100 comprising a floor 82 recessed below the blade tip 38 and a wall 83 surrounding the floor 82. In some aspects, the floor 82 may be recessed a constant depth from the leading edge 58 to the trailing edge 62. In further aspects, the wall 83 may be integral to the pressure sidewall 66, the suction sidewall 64, or both. One or more cooling holes may be formed in the floor 82 of the tip cavity 100. For example, in FIG. 3 cooling hole 84 and cooling holes 86 are formed in the floor 82. Cooling holes 86 may have a diffusing region 87 positioned between the floor 82 and the internal cooling circuit (best seen in FIG. 5). In other aspects, more cooling holes or fewer cooling holes may be present in the tip cavity 100. In further aspects, dust holes 85 may also be formed in the floor 82 of the tip cavity 100 for expelling debris from the airfoil 36. As best seen in FIG. 4, a pocket opening 110 (e.g., a gap) in the wall 83 is present. The pocket opening 110 is located at the trailing edge 62. Thus, cooling medium present in the tip cavity 100 may exit the tip cavity 100 through the pocket opening 110 without spilling over the wall 83.

A number of additional cooling holes may be formed in the airfoil 36. For example, as seen in FIG. 2, cooling holes 68 may be formed proximate the leading edge 58 and proximate the blade tip 38. Further, cooling holes 105 may be formed in the airfoil 36 along the trailing edge 62.

The turbine blade 20A may be supplied cooling medium through an internal cooling circuit. The cooling medium may comprise compressed air. The cooling medium may enter the internal cooling circuit at the root portion 22 of the turbine blade 20A. The cooling circuit may then communicate the cooling medium throughout the turbine blade 20A. For example, the cooling circuit may extend through the root portion 22, the platform 24, and the airfoil 36. Ultimately, the cooling circuit communicates the cooling medium to the cooling holes identified herein. The cooling circuit may comprise a single pathway, a plurality of pathways, an internal cavity, or any other type of chamber. The cooling holes identified herein may be in communication with the cooling circuit via passageways extending therebetween. The passageways may be formed during a casting process, a post-casting machining process, or any other manufacturing process.

Figure 5:
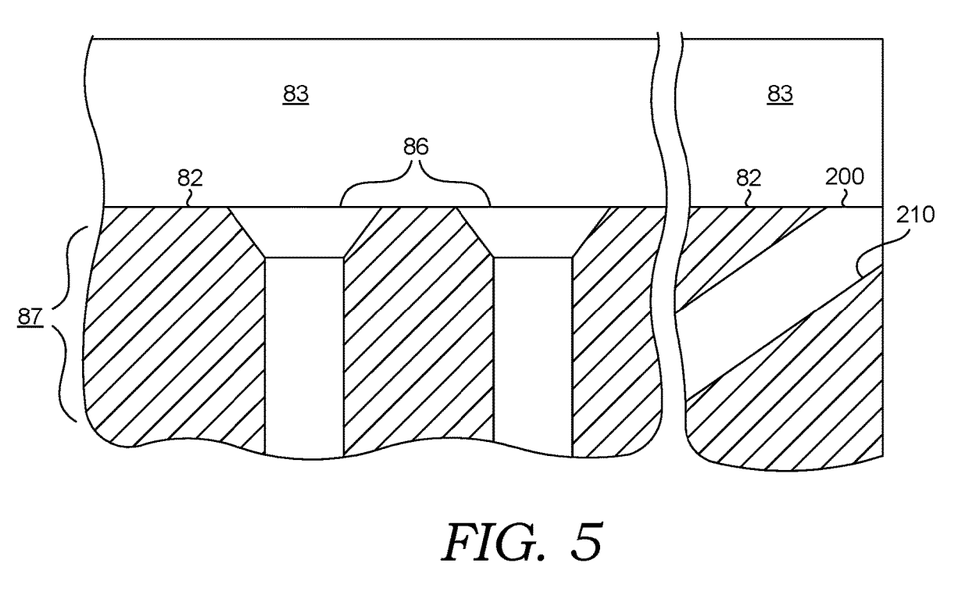
FIG. 5 depicts a cross-section of the blade tip of FIG. 4 taken along cut line 5-5, in accordance with aspects hereof.

Turning now to FIG. 5, a cross-section of the turbine blade 20A shown in FIG. 4 is depicted. Certain features have been omitted for ease of description. A cooling hole 200 is present proximate the intersection of the floor 82 and the trailing edge 62. In some aspects, a portion of the cooling hole 200 is formed in the floor 82 and a second portion of the cooling hole 200 is formed in the trailing edge 62. The cooling hole 200 is in communication with the internal cooling circuit via passageway 210. As depicted in FIG. 5, as passageway 210 extends from an internal portion of the airfoil 36 (e.g., from the internal cooling circuit) towards the cooling hole 200 it extends both radially outward (i.e., towards the blade tip 38) and downstream (i.e., towards the trailing edge 62). In other words, the passageway 210 is angles up from the internal cooling circuit to the corner of the airfoil 36. In some aspects, the passageway 210 has a constant cross-sectional area along its length such that the cooling medium is communicated at a constant velocity therethrough. More specifically, in these aspects there is not a diffuser at the aft end of the passageway 210 proximate the cooling hole 200.

Because the turbine blade 20A is subjected to thermal stresses from high temperature and high pressure gas from the combustor section (in FIG. 1) it is desirable to cool the airfoil as much as possible and as efficiently as possible. In the past, it has been particularly difficult to cool the portion of the blade tip 38 proximate the trailing edge 62. For example, the geometries of this portion of the turbine blade 20A are very small and difficult, if not impossible to cool via an internal cooling cavity. Further, cooling medium supplied to the tip cavity 100 would not stay within the tip cavity 100 from the leading edge 58 to the trailing edge 62. Rather, the cooling medium would spill over the wall 83 of the tip cavity 100 due to rotation of the turbine blade 20A.

The cooling hole 200 and passageway 210 solves both of these problems. First, the cooling medium communicated through the passageway 210 directly cools the structure of the airfoil 36 surrounding the passageway 210 via convection. Second, emitting the cooling medium from the cooling hole 200 proximate the intersection of the floor 82 of the tip cavity 100 and the trailing edge 62 induces cooling medium present in the tip cavity 100 to stay in the tip cavity 100 rather than spill over the wall 83 before reaching the pocket opening 110. This inducement occurs by creating a pressure differential at the pocket opening 110. The cooling medium emitted from the cooling hole 200 is travelling at a higher velocity than the cooling medium present in the tip cavity 100, thus the cooling medium in the tip cavity is drawn towards the lower pressure region proximate the cooling hole 200 and the pocket opening 100.

Figure 6:
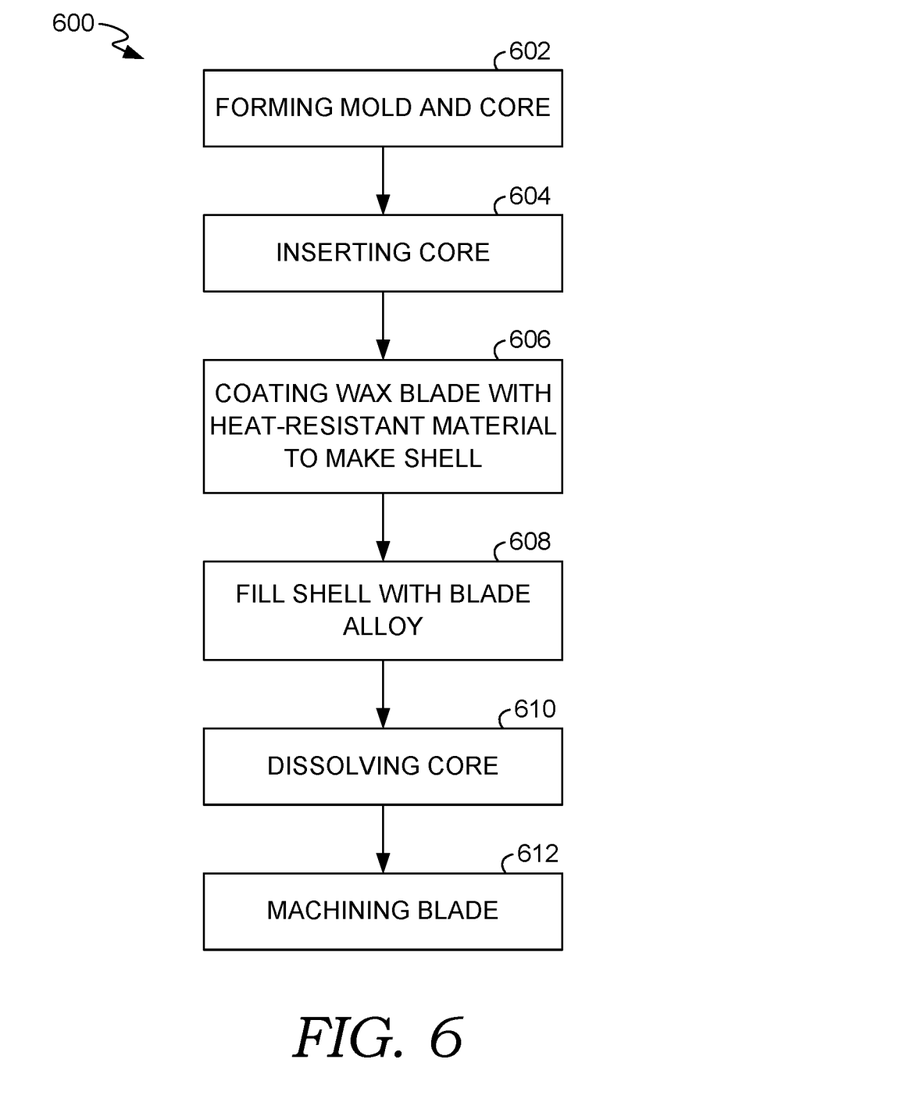
FIG. 6 depicts a method of manufacturing the turbine blade having the tip cavity, in accordance with aspects hereof.

Turning now to FIG. 6, flowchart 600 comprises a method for manufacturing a turbine blade. In aspects, the method comprises shaping an airfoil of a turbine blade in wax by enveloping a conventional alumina or silica based ceramic core. In some aspects, the method comprises a directional solidification or a single crystal production method. At 602, the method comprises forming a core and a mold. In embodiments, casting processes that may be used include an investment casting process (or lost-wax processing). The mold may comprise a wax or a similar temporary material.

The mold of the turbine blade comprises an airfoil having a pressure sidewall and a suction sidewall. The pressure sidewall is joined to the suction sidewall at a leading edge and a trailing edge. Further, the mold comprises a tip cavity at a distal end of the airfoil. In other aspects, the tip cavity is machined into the turbine blade after casting the turbine blade. In still other aspects, the tip cavity may be attached to a distal end of the airfoil after casting the turbine blade. Further, some aspects the tip cavity of the mold includes a wall surrounding a floor recessed from the distal end. The wall of the tip cavity has a pocket opening at the trailing edge of the airfoil. In aspects, the pocket opening is machined into the blade after casting the turbine blade.

At 604, the core is inserted into the mold. The core comprises a ceramic material and has a porous structure. In aspects, the core comprises a refractory mixture in the form of particles and a binder. The core defines an internal structure of the turbine blade, the internal structure comprising an internal cooling circuit that is configured for communication with a cooling medium inlet. In aspects, a passageway that will extend to an intersection of the tip cavity and the trailing edge is formed via the core, wherein the passageway extends from the hollow portion of the blade between the suction sidewall and the pressure sidewall to the cooling hole. In other aspects, this passageway is machined into the turbine blade after casting the turbine blade.

At 606, the method comprises coating the wax blade with heat-resistant material to make a shell. The heat-resistant material may comprise silicate. In aspects, the mold is repeatedly soaked in a foundry ceramic mass formed by a suspension of ceramic particles to obtain the shell mold and after removing the wax of the mold. Further, at 608, the turbine blade is obtained by casting the turbine blade around the core. The shell mold is filled with molten metal, which penetrates into the hollow space between the suction sidewall and the pressure sidewall of the shell of the mold and the core. The molten metal may include one or more of a nickel-based superalloy, chromium, cobalt, and rhenium, in accordance with some aspects. Furthermore, at 610, the core is dissolved, such as by exposure to an alkaline material. In some aspects, the core is removed via high temperatures in a furnace.

At 612, the method comprises machining the turbine blade. In some aspects, the method comprises drilling the tip cavity into the turbine blade instead of casting the tip cavity via the mold and the molten metal. In other aspects, one or more cooling holes may be machined into the turbine blade.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the turbine blade. It will be understood that certain features and sub-combinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or embodiments of this application at the time of filing, or one or more related applications, but the claims or embodiments are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of embodiments" or similar variations of said terminology is intended to be interpreted such that features of claims/embodiments may be combined in any combination. For example, an exemplary embodiment 4 may indicate the method/apparatus of any of embodiments 1 through 3, which is intended to be interpreted such that features of embodiment 1 and embodiment 4 may be combined, elements of embodiment 2 and embodiment 4 may be combined, elements of embodiment 3 and 4 may be combined, elements of embodiments 1, 2, and 4 may be combined, elements of embodiments 2, 3, and 4 may be combined, elements of embodiments 1, 2, 3, and 4 may be combined, and/or other variations.

The following embodiments are aspects contemplated herein.

Embodiment 1. A turbine blade comprising: a pressure sidewall extending from a leading edge to a trailing edge; a suction sidewall extending from the leading edge to the trailing edge and joined to the pressure sidewall at the leading edge and the trailing edge, wherein the pressure sidewall and the suction sidewall define an airfoil; an internal cooling circuit between the pressure sidewall and the suction sidewall; a tip cavity formed in a blade tip at a radially distal end of the airfoil, the tip cavity defined by a wall enclosing a floor; a pocket opening in the wall of the tip cavity at the trailing edge; a cooling hole formed in part through the floor of the tip cavity and in part through the trailing edge; and a passageway extending from the internal cooling circuit to the cooling hole to eject a cooling medium at the pocket opening.

Embodiment 2. The turbine blade of embodiment 1, wherein the pressure sidewall and the suction sidewall are integral to one another.

Embodiment 3. The turbine blade of embodiments 1 or 2, wherein the wall defining the tip cavity is integral to the pressure sidewall and the suction sidewall.

Embodiment 4. The turbine blade of any of embodiments 1-3, further comprising a root portion extending from a radially proximal end to a platform, wherein the airfoil extends distally from the platform, wherein the internal cooling circuit comprises a plurality of cooling chambers extending within the turbine blade through the root portion, the platform, and the airfoil.

Embodiment 5. The turbine blade of any of embodiments 1-4, further comprising a tip cavity cooling hole formed in the floor of the tip cavity and in communication with the internal cooling circuit.

Embodiment 6. The turbine blade of any of embodiments 1-5, wherein a diffusing region is present between the internal cooling circuit and the tip cavity cooling hole.

Embodiment 7. The turbine blade of any of embodiments 1-6, wherein the tip cavity cooling hole is nearer the leading edge than the trailing edge.

Embodiment 8. The turbine blade of any of embodiments 1-7, wherein the passageway does not include a diffusing region.

Embodiment 9. The turbine blade of any of embodiments 1-8, further comprising a plurality of cooling holes radially aligned along the trailing edge of the airfoil, wherein each of the plurality of cooling holes is in communication with the internal cooling circuit.

Embodiment 10. The turbine blade of any of embodiments 1-9, wherein the passageway extends at an angle from the internal cooling circuit to the cooling hole.

Embodiment 11. The turbine blade of any of embodiments 1-10, wherein the floor of the tip cavity is recessed a constant depth from a distal end of the wall from the leading edge to the trailing edge.

Embodiment 12. The turbine blade of any of embodiments 1-11, further comprising a dust hole formed in the floor of the tip cavity.

Embodiment 13. A method of manufacturing a turbine blade, the method comprising: casting the turbine blade around a core that defines an internal structure of the turbine blade, the internal structure comprising an internal cooling circuit in communication with a cooling medium inlet, wherein the turbine blade comprises: an airfoil having a leading edge, a trailing edge, a pressure sidewall, and a suction sidewall, each sidewall extending from the leading edge to the trailing edge around opposing sides of the core; and a tip cavity at a distal end of the airfoil, the tip cavity including a wall surrounding a floor recessed from the distal end, the wall having a pocket opening at the trailing edge of the airfoil. In addition, a passageway extends from the internal cooling circuit to cooling hole at the intersection of the floor of the tip cavity and the trailing edge of the airfoil.

Embodiment 14. The method of embodiment 13, wherein the turbine blade is cast around a portion of the core that defines the passageway.

Embodiment 15. The method of any of embodiments 13-14, wherein the cooling hole is formed in part through the floor of the tip cavity and in part through the trailing edge of the airfoil at the pocket opening.

Embodiment 16. The method of any of embodiments 13-15, wherein the passageway is formed in the airfoil by a machining process after removal of the core.

Embodiment 17. The method of any of embodiments 13-16, wherein the cooling hole is formed in part through the floor of the tip cavity and in part through the trailing edge of the airfoil at the pocket opening.

Embodiment 18. method of any of embodiments 13-17, removing the core from the cast turbine blade; and machining a plurality of cooling holes into the turbine blade after the core is removed.

Embodiment 19. Any of the aforementioned embodiments 1-18, in any combination.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A turbine blade comprising:
    a pressure sidewall extending from a leading edge to a trailing edge;
    a suction sidewall extending from the leading edge to the trailing edge and joined to the pressure sidewall at the leading edge and the trailing edge, wherein the pressure sidewall and the suction sidewall define an airfoil;
    an internal cooling circuit between the pressure sidewall and the suction sidewall;
    a tip cavity formed in a blade tip at a radially distal end of the airfoil, the tip cavity defined by a wall enclosing a floor;
    a pocket opening in the wall of the tip cavity at the trailing edge;
    a cooling hole formed in part through the floor of the tip cavity and in part through the trailing edge; and
    a passageway extending from the internal cooling circuit to the cooling hole to eject a cooling medium at the pocket opening.

2. The turbine blade of claim 1, wherein the pressure sidewall and the suction sidewall are integral to one another.

3. The turbine blade of claim 2, wherein the wall defining the tip cavity is integral to the pressure sidewall and the suction sidewall.

4. The turbine blade of claim 1 further comprising a root portion extending from a radially proximal end to a platform, wherein the airfoil extends distally from the platform, wherein the internal cooling circuit comprises a plurality of cooling chambers extending within the turbine blade through the root portion, the platform, and the airfoil.

5. The turbine blade of claim 1 further comprising a tip cavity cooling hole formed in the floor of the tip cavity and in communication with the internal cooling circuit.

6. The turbine blade of claim 5, wherein a diffusing region is present between the internal cooling circuit and the tip cavity cooling hole.

7. The turbine blade of claim 5, wherein the tip cavity cooling hole is nearer the leading edge than the trailing edge.

8. The turbine blade of claim 1, wherein the passageway does not include a diffusing region.

9. The turbine blade of claim 1 further comprising a plurality of cooling holes radially aligned along the trailing edge of the airfoil, wherein each of the plurality of cooling holes is in communication with the internal cooling circuit.

10. The turbine blade of claim 1, wherein the passageway extends at an angle from the internal cooling circuit to the cooling hole.

11. The turbine blade of claim 1, wherein the floor of the tip cavity is recessed a constant depth from a distal end of the wall from the leading edge to the trailing edge.

12. The turbine blade of claim 1 further comprising a dust hole formed in the floor of the tip cavity.

13. A method of manufacturing a turbine blade, the method comprising:
casting the turbine blade around a core that defines an internal structure of the turbine blade, the internal structure comprising an internal cooling circuit in communication with a cooling medium inlet, wherein the turbine blade comprises:
an airfoil having a leading edge, a trailing edge, a pressure sidewall, and a suction sidewall, each sidewall extending from the leading edge to the trailing edge around opposing sides of the core; and
a tip cavity at a distal end of the airfoil, the tip cavity including a wall surrounding a floor recessed from the distal end, the wall having a pocket opening at the trailing edge of the airfoil,
wherein a passageway extends from the internal cooling circuit to a cooling hole at the intersection of the floor of the tip cavity and the trailing edge of the airfoil.

14. The method of claim 13, wherein the turbine blade is cast around a portion of the core that defines the passageway.

15. The method of claim 14, wherein the cooling hole is formed in part through the floor of the tip cavity and in part through the trailing edge of the airfoil at the pocket opening.

16. The method of claim 13, wherein the passageway is formed in the airfoil by a machining process after removal of the core.

17. The method of claim 16, wherein the cooling hole is formed in part through the floor of the tip cavity and in part through the trailing edge of the airfoil at the pocket opening.

18. The method of claim 13 further comprising:
removing the core from the cast turbine blade; and
machining a plurality of cooling holes into the turbine blade after the core is removed.

* * * * *